US011402988B2

(12) United States Patent
Lucca

(10) Patent No.: US 11,402,988 B2
(45) Date of Patent: Aug. 2, 2022

(54) TILING SCROLL DISPLAY

(71) Applicant: Viacom International Inc., New York, NY (US)

(72) Inventor: Allysson Lucca, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 885 days.

(21) Appl. No.: 15/807,217

(22) Filed: Nov. 8, 2017

(65) Prior Publication Data

US 2019/0138175 A1 May 9, 2019

(51) Int. Cl.
*G06F 3/0482* (2013.01)
*G06F 3/0485* (2022.01)
*G06F 3/04817* (2022.01)

(52) U.S. Cl.
CPC .......... *G06F 3/0485* (2013.01); *G06F 3/0482* (2013.01); *G06F 3/04817* (2013.01)

(58) Field of Classification Search
CPC .................................................... G06F 3/0482
USPC ......................................................... 715/784
See application file for complete search history.

(56) References Cited

U.S. PATENT DOCUMENTS

| 6,407,757 | B1* | 6/2002 | Ho ...................... G06F 3/03547 715/776 |
| 7,739,306 | B2* | 6/2010 | Manousos ............ H04N 1/2141 345/98 |
| 8,836,658 | B1* | 9/2014 | Jia ........................ G06F 3/0488 345/173 |
| 8,881,032 | B1* | 11/2014 | Weber ................... G06F 3/0483 715/764 |
| 2005/0251748 | A1* | 11/2005 | Gusmorino ........... G06F 3/0481 715/713 |
| 2006/0041846 | A1* | 2/2006 | Masselle ............... G06F 3/0481 715/793 |
| 2006/0161868 | A1* | 7/2006 | Van Dok ............. G06F 3/04842 715/835 |
| 2008/0307343 | A1* | 12/2008 | Robert .................. G06F 16/116 715/765 |

(Continued)

OTHER PUBLICATIONS

F*** Google+, "Coverflow with 800 albums—The reason why the iPhone rules the world", published Mar. 18, 2012, available at <<https://www.youtube.com/watch?v=pNUL70XDZg0>>, 7 pages (Year: 2012).*

(Continued)

*Primary Examiner* — Daniel Rodriguez
(74) *Attorney, Agent, or Firm* — Fay Kaplun & Marcin, LLP

(57) ABSTRACT

A list of items is shown in a tiling scroll display. A method generates a graphical user interface including a scroll display for a set of items. The method includes determining a number of items. The method includes generating a tile section to include full tiles for each of a first subset of the items, the first subset including up to a display threshold that defines a number of items for the tile section. The method includes when the number of items is greater than the display threshold, generating a stack section to include preview tiles for each of a second subset of the items, the second subset of the items including up to a stack threshold that defines a number of items for the stack section. The method includes generating the scroll display to include the tile section and the stack section.

20 Claims, 3 Drawing Sheets

(56) References Cited

U.S. PATENT DOCUMENTS

| | | | |
|---|---|---|---|
| 2008/0307360 A1* | 12/2008 | Chaudhri | G06F 3/0481 715/835 |
| 2008/0307364 A1* | 12/2008 | Chaudhri | G06F 3/0483 715/836 |
| 2009/0172090 A1* | 7/2009 | Lit | G06Q 30/0277 715/781 |
| 2010/0058248 A1* | 3/2010 | Park | G06F 3/0481 715/851 |
| 2010/0175026 A1* | 7/2010 | Bortner | G06F 16/44 715/825 |
| 2011/0246942 A1* | 10/2011 | Misawa | G06F 3/0485 715/830 |
| 2011/0270824 A1* | 11/2011 | Morris | G06F 16/9038 715/830 |
| 2011/0296351 A1* | 12/2011 | Ewing, Jr. | G06F 3/04815 715/854 |
| 2012/0154444 A1* | 6/2012 | Fernandez | G06F 3/0482 345/441 |
| 2012/0185456 A1* | 7/2012 | Hart | G06F 3/0481 707/706 |
| 2012/0185880 A1* | 7/2012 | Jalon | G06F 16/168 719/328 |
| 2013/0076591 A1* | 3/2013 | Sirpal | G09G 5/00 345/1.3 |
| 2013/0091451 A1 | 4/2013 | Holecek et al. | |
| 2013/0185642 A1* | 7/2013 | Gammons | G06F 3/04817 715/765 |
| 2014/0229854 A1 | 8/2014 | Caine et al. | |
| 2015/0070283 A1* | 3/2015 | Irwin | G06F 3/04883 345/173 |
| 2015/0242110 A1* | 8/2015 | Balakrishnan | H04L 67/02 715/830 |
| 2015/0378526 A1 | 12/2015 | Ramanathan et al. | |
| 2016/0004393 A1* | 1/2016 | Faaborg | G06F 3/0482 715/765 |
| 2016/0291848 A1* | 10/2016 | Hall | G06F 3/04817 |
| 2018/0329585 A1* | 11/2018 | Carrigan | H04N 21/8173 |
| 2019/0198152 A1* | 6/2019 | Hakansson | G06F 3/0482 |
| 2019/0313059 A1* | 10/2019 | Agarawala | H04L 65/403 |

OTHER PUBLICATIONS

Matt Doyle, "Cover Flow Remade with CSS and jQuery", available on May 6, 2011, available at <<https://www.elated.com/cover-flow-remade-with-css-and-jquery/>>, 31 pages (Year: 2011).*

* cited by examiner

TILING SCROLL DISPLAY

BACKGROUND INFORMATION

A user may view information via a display of a user device. For example, a graphical user interface may be provided for the user to view the information. The information may be shown in a plurality of different manners using various graphical user interfaces. Among the types of information that may be shown, the graphical user interface may be used to display a list of items for the user. For example, the list of items may be files in a folder, a plurality of selections to view, etc. The list of items may also be shown in a plurality of different manners. In a first example, the operating system of the user device, a website server, an application, etc. (referred to herein as "information source") may generate a first type of graphical user interface that utilizes a list display where all items are shown in a window. When items cannot be included in the window, a scroll bar feature may be used in which the user enters an input to move the scroll bar which moves a display portion of the window. In this manner, the non-displayed items may be seen. In a second example, a second type of graphical user interface may be generated where a scroll display is used for the items to be shown in a row with a predetermined number of items being shown in the row at a time. The user may enter an input to move the row and see further items in the list in a subsequent row that is shown (e.g., to scroll through the items).

The manner in which the list of items is shown in a graphical user interface, particularly in the scroll display, is not intuitive for the user to identify the number of remaining items or when the end of the list of items is approaching. In fact, some graphical user interfaces using scroll displays may be a substantially "endless" horizontal scrolling display where the end of the list of items is unknown until the user reaches the end. Even with a scroll bar or other identifying marker, the user can only estimate how many remaining items are left or when the end of the list of items is reached. Furthermore, the scroll display using known mechanisms only show whichever items are selected for a given row. That is, under conventional graphical user interfaces, there is no information available for any of the items that have passed or are upcoming in a scroll display. Therefore, the user viewing the scroll display is only provided information of the items in the row without any further information regarding an end to the list of items or items that will be shown in subsequent rows.

SUMMARY

The exemplary embodiments are directed to a method for generating a graphical user interface including a scroll display for a set of items, comprising: determining a number of items in the set of items; generating a tile section for the scroll display to include full tiles for each of the items, the first subset of the items including up to a display threshold, the display threshold defining a predetermined number of items to be included in the tile section; when the number of items is greater than the display threshold, generating a stack section for the scroll display to include preview tiles for each of a second subset of the items, the second subset of the items including up to a stack threshold, the stack threshold defining a predetermined number of items to be included in the stack section; and generating the scroll display to include the tile section and the stack section.

The exemplary embodiments are directed to a user device, comprising: a display device configured to show a graphical user interface including a scroll display for a set of items; and a processor generating the scroll display by: determining a number of items in the set of items; generating a tile section for the scroll display to include full tiles for each of a first subset of the items, the first subset of the items including up to a display threshold, the display threshold defining a predetermined number of items to be included in the tile section; when the number of items is greater than the display threshold, generating a stack section for the scroll display to include preview tiles for each of a second subset of the items, the second subset of the items including up to a stack threshold, the stack threshold defining a predetermined number of items to be included in the stack section; and generating the scroll display to include the tile section and the stack section.

The exemplary embodiments are directed to a server, comprising: a processor generating a graphical user interface including a scroll display for a set of items, the graphical user interface to be shown on a display device of a user device, the processor generating the scroll display by: determining a number of items in the set of items; generating a tile section for the scroll display to include full tiles for each of a first subset of the items, the first subset of the items including up to a display threshold, the display threshold defining a predetermined number of items to be included in the tile section; when the number of items is greater than the display threshold, generating a stack section for the scroll display to include preview tiles for each of a second subset of the items, the second subset of the items including up to a stack threshold, the stack threshold defining a predetermined number of items to be included in the stack section; and generating the scroll display to include the tile section and the stack section; and a transceiver configured to transmit the graphical user interface to the user device.

DETAILED DESCRIPTION

Figure 1:
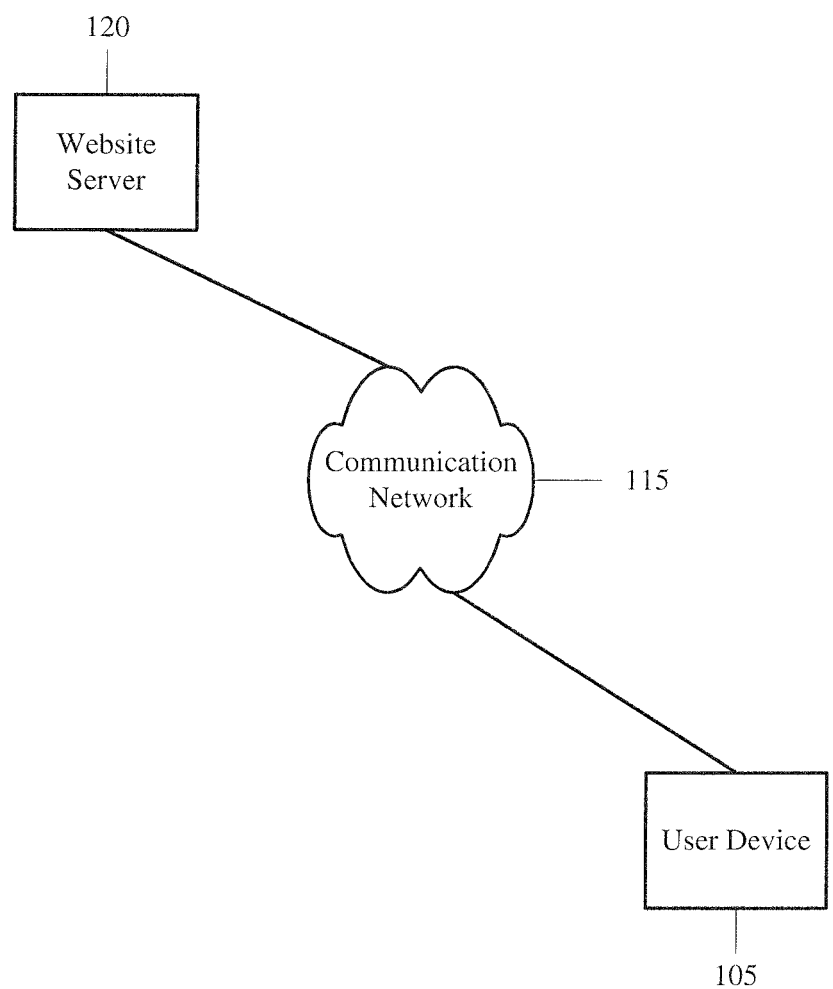
FIG. 1 shows a system according to the exemplary embodiments.

The exemplary embodiments may be further understood with reference to the following description and the related appended drawings, wherein like elements are provided with the same reference numerals. The exemplary embodiments are related to a device, system, and method for generating a graphical user interface including a scroll display for a list of items where a user is able to identify upcoming items in the list as well as identify a number of remaining items in the list. As will be described in detail below, the graphical user interface may utilize the scroll display by incorporating intuitive features for a user viewing the scroll display to immediately identify the upcoming items and number of remaining items so that the user may clearly navigate through the scroll display with a clear navigation user experience.

FIG. 1 shows a system 100 according to the exemplary embodiments. The system 100 may include a user device 105 that is configured to show a list of items in a scroll display according to the exemplary embodiments to a user of the user device 105. The list of items may be information stored on the user device 105 or received from a remote source such as a website server 120. It is noted that the website server 120 may represent any remote source from which information may be received by the user device 105. For example, the website server 120 may represent another user device, a network component, a system, etc. The information may be exchanged between the components of the system 100 via the communications network 115. It should be noted that the system 100 is shown with connections between the components. However, those skilled in the art will understand that these connections may be through a wired connection, a wireless connection, interactions between integrated components or software subroutines, or a combination thereof.

The scroll display according to the exemplary embodiments may be generated by different components of the system 100. For example, the user device 105 may be configured to generate the scroll display based on the list of items for which the scroll display is to be generated. As noted above, the list of items may be information stored on the user device 105 or received from the website server 120. In another example, the user device 105 may be configured to show the scroll display that is received from the website server 120, the website server 120 being configured to generate the scroll display for the list of items.

The user device 105 may be executing any of a variety of different applications in which the scroll display may be used to display a list of items. In a first example, the user device 105 may be executing an operating system in which data files in folders of the operating system that are stored on the user device 105 are shown in the scroll display. As those skilled in the art will understand, the operating system may be based on any platform and that these platforms may utilize windows or other display areas in which the items are shown. In a second example, the user device 105 may be executing a program in which items are being shown in the scroll display. The list of items in the program may be selectable for a particular feature to be used (e.g., a list of available templates in a word processing program). In a third example, the user device 105 may be executing a browser application in which data is being exchanged with the website server 120. The graphical representation for the website being hosted by the website server 120 may be shown in an area of the user device 105 and may include the scroll display.

It is noted that the user device 105 may be configured with the necessary hardware, software, and firmware to generate or show the scroll display. For example, the user device 105 may include a processor, a memory, a display device, a transceiver, etc. The website server 120 may also be configured with the necessary hardware, software, and firmware to generate and transmit the scroll display to the user device 105.

It is also noted that the communications network 115 may be any type of network that enables information to be transmitted between the user device 105 and the website server 120. For example, the communications network 115 may be a cable provider network, a satellite network, a terrestrial antenna network, the public Internet, a local area network (LAN), a wide area network (WAN), a virtual LAN (VLAN), a Wi-Fi network, a cellular network, a cloud network, a wired form of these networks, a wireless form of these networks, a combined wired/wireless form of these networks, etc. The communications network 115 may also represent one or more networks that are configured to connect to one another to enable the data to be exchanged among the components of the system 100. The communications network 115 may also include network components (not shown) that are configured to perform further functionalities in addition to providing a conduit to exchange data.

Figure 2:
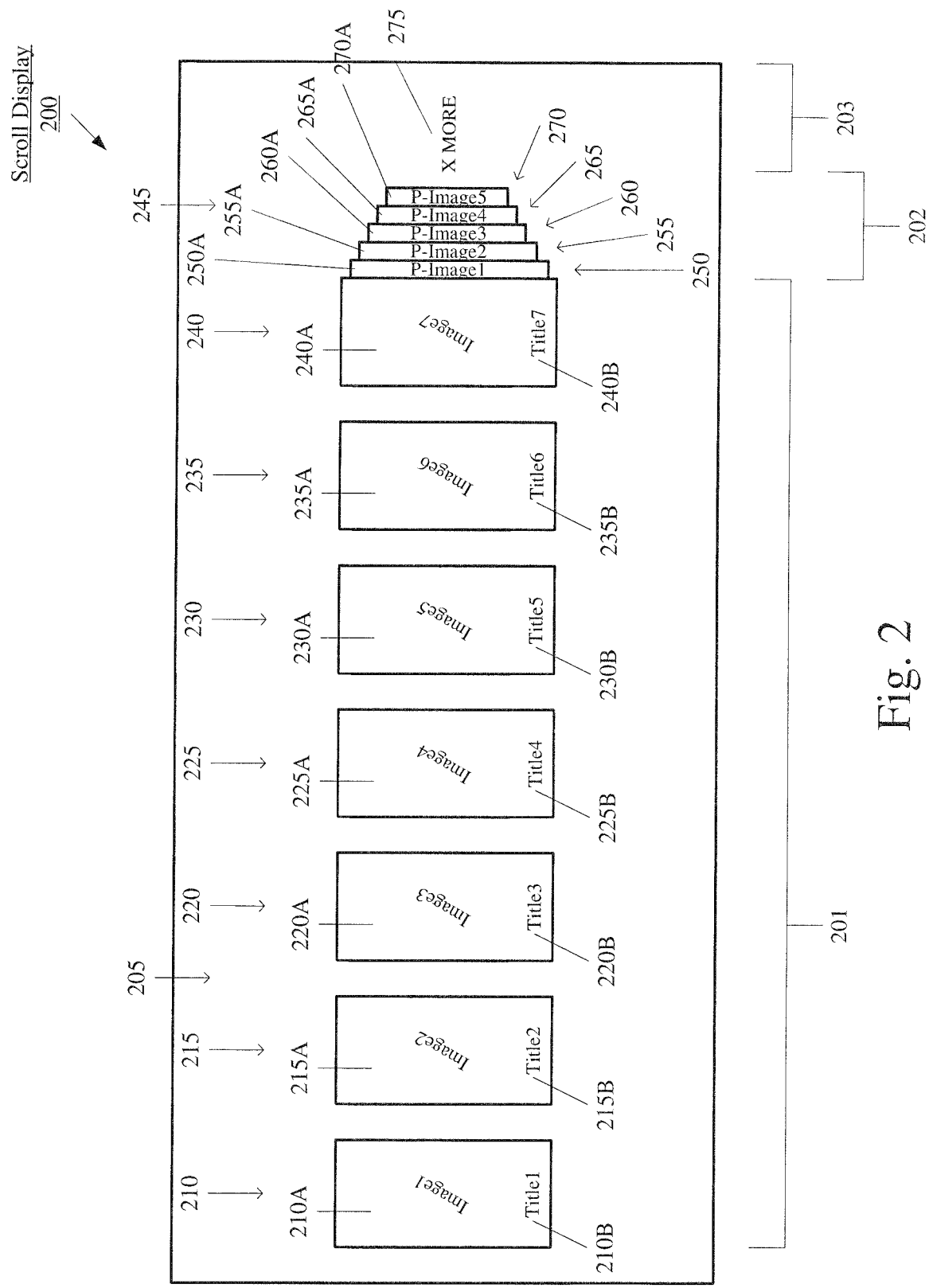
FIG. 2 shows a scroll display of items according to the exemplary embodiments.

FIG. 2 shows a scroll display 200 of items according to the exemplary embodiments. As noted above, the scroll display 200 may be generated by the user device 105 or the website server 120 for a list of items. The scroll display 200 shows a plurality of items in a horizontal scroll. However, it is noted that the orientation of the scroll display 200 being horizontal is only exemplary. The exemplary embodiments may be modified such that the scroll display 200 may be in any orientation such as vertical, diagonal, etc. The scroll display 200 also shows the plurality of items where a start of the scroll display 200 is to the left while the end of the scroll display 200 is to the right. However, it is noted that the direction of the scroll display 200 being left to right is only exemplary. The exemplary embodiments may be modified such that the scroll display 200 may be in any direction such as right to left, top to bottom, bottom to top, etc. The orientation and direction of the scroll display 200 may be set in a variety of different manners. In a first example, the scroll display 200 may be set in a predetermined manner where an administrator or designer indicates the orientation/direction. In a second example, the scroll display 200 may be set by a user where the user selects a desired orientation/direction based on personal preference. In a third example, the scroll display 200 may be set in a predetermined manner but also in a dynamic manner where depending on the implementation of the scroll display 200 (e.g., for an operating system, for a website, for a program, etc.), the orientation/direction is predetermined based on type.

The scroll display 200 may include a plurality of different sections. As illustrated, the scroll display 200 may include a tile section 201, a stack section 202, and an indicator section 203. The tile section 201 may include a row 205 including a plurality of tiles 210-240. The stack section 202 may include a stack 240 including a plurality of partial tiles 250-270. The indicator section 203 may include an indicator 275.

The tile section 201 may be a section in which a number of items is fully shown. Specifically, the tiles 210-240 may represent the items being fully shown in the tile section 201. The row 205 may be a horizontal scroll of items in which the tiles 210-240 of the tile section 201 may be a full depiction of the respective items. In the exemplary embodiments, a full depiction may refer to at least one identifying feature being viewable in its entirety within a boundary of the tile. For example, as shown, the tiles 210-240 may include an image 210A-240A and a title 210B-240B, respectively, that may be seen in each of the tiles 210-240. The images 210A-240A may refer to the identifying feature being expressed in a character or element associated with the content of the tile (e.g., a character in a television show). The titles 210B-240B may refer to the identifying feature being expressed in words/numbers/typographic characters (e.g., a name of the television show) that may be horizontally, vertically, or diagonally positioned. In this manner, a user viewing the scroll display 200 may identify the items in the row 205 with these identifying features by reading the title which is shown in its entirety or seeing characters/elements associated with the content of the tiles in the image (e.g., a movie poster).

It is noted that the number of items that are being shown in the tile section 201 being seven is only exemplary. According to another exemplary embodiment, the tile section 201 may include any number of items, either more or less than seven. The number of items being shown in the tile section 201 may also be predetermined, dynamically selected, or user specified. For example, the tile section 201 may have a setting that indicates a maximum number of items that may be included in the tile section 201. This maximum number may have been predetermined by an administrator or designer, may have been selected by the user, or may have been predetermined based on the type of implementation. In another example, when the number of tiles is less than the maximum number, the tile section 201 may include tiles that correspond to this number. As will be described in further detail below, the manner in which the tile section 201 is generated may be based on the number of items in the list that are to be included in the scroll display 200. In a further example, based on the number of items in the list, the tiles in the tile section 201 may be resized accordingly. For example, if the number of tiles is the maximum number, the tiles may be sized with a smallest size for all the tiles to be shown properly. In another example, if the number of tiles is less than the maximum number, the tiles may be sized with a larger size to fit an area in which the tile section 201 is shown.

The tile section 201 in the scroll display 200 according to the exemplary embodiments may include a variety of features and/or modifications. In a first example, the tiles 210-240 including the respective image 210A-240A covering an entire area of the tile with the respective title 210B-240B in a bottom portion of the tile is only exemplary. According to another exemplary embodiment, the image and title may be positioned in a variety of different manners. For example, the title may be superimposed over the image such that no element in the image blocks the title. In another example, elements of the image may be superimposed over portions of the title while maintaining a readability of the title.

In a second example, the position of the titles 210B-240B near a bottom portion of the tiles 210-240, respectively, is only exemplary. According to another exemplary embodiment, the titles 210B-240B may be positioned anywhere within the tiles 210-240, respectively. The titles 210B-240B are also not required to be consistently in the same portion within the tiles 210-240, respectively. That is, the title 210B in the tile 210 may be in a first position, the title 215B in the tile 215 may be in a second position different from the first position, etc.

The stack section 202 may be a section in which a number of items is shown in a preview mode. Specifically, the tiles 250-270 may represent the items being shown in the stack section 202. In an example, the preview mode may refer to the items in the tiles 250-270 being partially shown or in any capacity that is less than the full depiction of the tiles 210-240 in the tile section 201. The stack 245 may be a cascading and size decreasing scroll of items in which the tiles 250-270 of the stack section 202 may be a preview depiction of the respective items. In the exemplary embodiments, when the preview mode is a partial depiction, the partial depiction may refer to at least one identifying feature being viewable only partially and not in its entirety within a boundary of the tile. For example, the tiles 250-270 may include a preview image 250A-270A, respectively, that may be seen in each of the tiles 250-270. In a substantially similar manner as the images 210A-240A, the preview images 250A-270A may refer to the identifying feature being expressed in a character or element associated with the content of the tile. In this manner, a user viewing the scroll display 200 may be capable of identifying the items in the stack 245 with this identifying feature by seeing characters/elements associated with the content of the tiles in the image (e.g., movie poster).

The preview images 250A-270A may be selected based on a variety of factors. For example, the preview images 250A-270A may be based on the image that would be used if tiles 250-270 were to be viewed in the row 205 (hereinafter referred to as a "row image"). Accordingly, the preview images 250A-270A would be a subset of the respective row image. In this manner, the preview images 250A-270A may be a partial depiction of the row image. In another example, the preview images 250A-270A may be an entirely different image from the row image that encapsulates the characters/elements of the content of the tile. However, this entirely different image may still be based on the content of the tile. It is noted that the use of the preview images 250A-270A is only exemplary. According to another exemplary embodiment, the identifying feature used in the preview images 250A-270A may be a title or a combination of title/image. The image or title used in the preview images 250A-270A may be intended to provide a preview for the user of upcoming tiles in the tile section 201 when a forward scrolling option is exercised. When the title is used in the tiles 250-270 of the stack 245, the title is not required to be shown in its entirety although this option may also be used based on an available space in the tiles 250-270. Those skilled in the art will understand that a title of the content of the tile (especially for media content such as movies or television programs) may have a unique or identifiable manner of being expressed (e.g., a particular font, a special manner of replacing a letter or number with a unique character, etc.). Accordingly, the title may also be depicted in a preview mode (e.g., partial depiction) where the user may still be capable of knowing an identity of the content of the tile even without the full title being available.

As illustrated, the stack 245 is shown cascading from the tile 240. That is, in one exemplary embodiment, the stack 245 may extend from a final tile in the row 205. Thus, if the row includes only one tile, the stack 245 may extend from this tile; if the row includes five tiles, the stack 245 may extend from the fifth tile; etc. In this manner, the stack 245 relates to ensuing items in the list that proceed the tile 240. However, it is noted that the stack 245 extending from the tile 240 is only exemplary. According to another exemplary embodiment, the stack 245 may extend from any of the tiles in the row 205. As will be described in detail below, in a particular implementation of the scroll display 200 according to the exemplary embodiment, the stack 245 may also extend from the first tile 210 to show items preceding the tile 210. In particular, the stack 245 may extend on an opposite side (e.g., left side) of the tile 210 relative to a direction in which the stack 245 extends from the tile 240 (e.g., right side). It is further noted that the stack 245 may extend from the tile 240 in any direction. As shown, the stack 245 may extend in the same direction as the row 205 (e.g., horizontally). However, in other exemplary embodiments, the stack 245 may extend in a different direction than the row 205 (e.g., vertically from a bottom edge of the tile 240).

Similar to the tiles 210-240 in the row 205, the number of items that are being shown in the stack section 202 being five is only exemplary. According to another exemplary embodiment, the stack section 202 may include any number of items, either more or less than five. The number of items being shown in the stack section 202 may also be predetermined, dynamically selected, or user specified in a similar manner as the tiles 210-240 in the row 205. As will be described in further detail below, the manner in which the stack section 202 is generated may be based on the number of items in the list that are to be included in the scroll display 200 and a maximum number of items that are allowed to be included in the row 205.

The stack section 202 in the scroll display 200 according to the exemplary embodiments may include a variety of features and/or modifications. In a first example, the stack 245 is shown decreasing in height and cascading from the tile 240. However, the size decrease and the size of the cascade is only exemplary. According to another exemplary embodiment, the tiles 250-270 in the stack 245 may have a substantially similar height as the tile 240 and retain this length for each subsequent tile. According to a further exemplary embodiment, the tiles 250-270 in the stack 245 may have different heights and widths as each tile 250-270 extends from the tile 240. According to yet another exemplary embodiment, the tiles 250-270 may increase in height.

In a second example, the preview images 250A-270A may be predetermined or may be identified based on the row image that would be used if the tiles 250-270 were to be shown in the row 205 of the tile section 201. That is, the component that generates the scroll display 200 (e.g., the user device 105 or the website server 120) may receive the row images for the tiles 250-270. In one manner, the component may also receive the preview images 250A-270A which are to be used while the tiles 250-270 are in the stack 245. In another manner, the component may be configured to determine which portion of the row images is to be used for the preview images 250A-270A. The component may perform any of a variety of operations in generating the preview images 250A-270A from the row images such as cropping, resizing, zooming out, zooming in, etc.

In a third example, the image characteristics of the preview images 250A-270A in the tiles 250-270, respectively, may be changed from the image characteristics of the images 210A-240A. Specifically, a brightness or clarity of the preview images 250A-270A may be of a lesser intensity than the brightness or clarity of the images 210A-240A. For example, the preview images 250A-270A may be dimmer or faded compared to the images 210A-240A. In another example, the preview images 250A-270A may progressively be more (or less) dimmed and/or more (or less) faded from the preview image 250A to the preview image 270A.

In a fourth example, as noted above, the stack 245 may be created for preceding items in the list. Accordingly, when the user is done viewing the tiles 210-240 in the row 205, a preceding stack may be created extending from a left edge of a first tile in a new row that is being shown in the tile section 201. The preceding stack may be substantially similar to the proceeding stack 245 that extends from the right edge of the last tile. When an ordering of the tiles 210-240 is retained, the preceding stack may include tiles 220-240 when the maximum number of items that may be included in a stack is five. Thus, the tile 240 may be created as a tile in the preceding stack, followed by the tile 235 to a preceding side (e.g., left edge), followed by the tile 230, 225, and 220.

The indicator section 203 may be a section in which the indicator 275 provides information related to an end or remaining items of the list of items that are being shown through the scroll display 200. The indicator 275 may be any representation that identifies to the user the number of remaining items. For example, the indicator 275 may state "X MORE" where X is the number of remaining items. The number indicated in the indicator 275 may refer to remaining items inclusive or exclusive of the items in the stack 245. For example, if the stack 245 represents items 11-15 of the list and there are 20 total items, the indicator 275 may indicate "5 MORE" when exclusive of the stack 245 or "10 MORE" when inclusive of the stack 245. For illustrative purposes, the exemplary embodiments are described with the indicator 275 being inclusive of the items in the stack 245. In this manner, a user viewing the scroll display 200 may be capable of identifying how many more items may be viewed in the scroll display 200. As will be described in further detail below, the manner in which the indicator section 203 is generated may be based on the number of items in the list that are to be included in the scroll display 200, a maximum number of items that are allowed to be included in the row 205, and a maximum number of items that are allowed to be included in the stack 245.

The indicator section 203 in the scroll display 200 according to the exemplary embodiments may include a variety of features and/or modifications. In a first example, the position of indicator 275 proceeding the stack 245 is only exemplary. According to another exemplary embodiment, the indicator 275 may be placed in any position in the scroll display 200 where a user may view the information in the indicator 275 and understand the status of the remaining items in the list.

In a second example, the indicator 275 may be used to represent different statuses of the remaining items of the list. As noted above, one status may be a number of remaining items. This number may be any positive integer value or may be zero. In another exemplary embodiment, the indicator 275 may indicate that no further remaining items are left by stating "END" or a term having a similar meaning. In yet another exemplary embodiment, the indicator 275 may indicate whether the list of items is being repeated if the scroll display 200 is configured to loop back to a first item after the last item has been reached.

In a third example, the indicator 275 may be created for preceding items in the list not shown in a preceding stack. Accordingly, when the preceding stack grows larger than a maximum number of items allowed to be included in the preceding stack, a preceding indicator may be included to represent the items that are preceding and not shown in the preceding stack. Thus, a substantially similar stack and indicator feature may be used for items remaining in the list as well as for items preceding or already viewed by the user.

In addition to the features/modifications to each section 201, 202, 203, the scroll display 200 according to the exemplary embodiments may also include a variety of features and/or modifications. In a first example, the scroll display 200 may include a display section (not shown) in which information for a selected tile among the tiles 210-240 in the tile section 201 is shown. For example, when the scroll display 200 is used for media content to be selected and viewed by a user, the display section may show a description of the media content in the selected tile.

In a second example, the scroll display 200 may include a selection status for the tiles 210-240 in the tile section 201. For example, one or more tiles in the tile section 201 may be selected by the user and a border for the one or more tiles may be highlighted or otherwise indicated as having been selected. A user may utilize an input device (e.g., a mouse cursor, a touch screen scroll, or arrow keys on a keyboard) to scroll through the items in the scroll display 200 and also select scroll items (e.g., a mouse clock or "enter" on the keyboard). When this operation is registered, the selection status may be indicated.

In a third example, the scroll display 200 may include scrolling input markers which allow the user to scroll through the items in the scroll display 200. For example, with a horizontal row 205, a right arrow marker, when used, may allow the user to scroll to the right or view proceeding items. A left arrow marker, when used, may allow the user to scroll to the left or view preceding items.

According to the exemplary embodiments, the scroll display 200 may be generated based on the number of items in the list, the maximum number of items allowed to be in the row 205 of the tile section 201, and the maximum number of items allowed to be in the stack 245 of the stack section 202. Based on the exemplary embodiment shown in the scroll display 200 of FIG. 2, the maximum number of items allowed in the row 205 of the tile section 201 is seven. The maximum number of items allowed in the stack 245 of the stack section 202 is five. In an example, if the number of items in the list is fifty and the tile 210 is the first item in the list, the row 205 may include seven items, the stack 245 may include five items, and the indicator 275 may indicate that there are forty three remaining items (inclusive of the items in the stack). In another example, if the number of items in the list is ten and the tile 210 is the first item in the list, the row 205 may include seven items, the stack 245 may include three items, and the indicator 275 may indicate that there are three remaining items (inclusive of the items in the stack). In a further example, if the number of items in the list is five and the tile 210 is the first item in the list, the row 205 may include five items and the stack 245 and the indicator 275 may be omitted as there are no remaining items after the fifth tile of the tile section 201.

The above examples relate to when the scroll display 200 is first created and prior to any scrolling input received from the user. That is, the above description relates to an initial output. However, when the scrolling input is received to scroll beyond the items being shown in the tile section 201, the scroll display 200 may be updated. Returning to the example where the maximum number of items allowed in the row 205 of the tile section 201 being seven, the maximum number of items allowed in the stack 245 of the stack section 202 being five, and the number of items in the list being fifty, the user may have entered a first forward scrolling input. When the first forward scrolling input is received, the scroll display 200 is updated from the initial output to a following output. Specifically, the seven tiles in the initial output are shifted out while the five tiles in the stack of the initial output of the stack section 202 are shifted into the tile section 201. Since there are still more remaining items, two more tiles are also shifted into the tile section 201. In this manner, a new set of seven tiles are shown in the row 205 of the tile section 201 for the following output where the first five of these seven tiles coincide with the tiles of the stack in the initial output. The following output also includes a new set of five tiles in the stack section 202. The following output further includes an indicator 275 that states that there are thirty six items remaining (inclusive of the items in the stack of the following output).

The above process may continue until the user has entered seven forward scrolling inputs. When the seventh forward scrolling input has been received, the scroll display 200 is updated from a sixth output to a seventh output. At this stage, the seventh output may include items 43 to 49 in the tiles of the row 205 in the tile section 201. There may also be one tile in the stack 245 of the stack section 202. Accordingly, the indicator 275 may state that there is one item remaining. When an eighth forward scrolling input has been received, the scroll display 200 is updated for a final time to an eighth output where the $50^{th}$ item in the list is included as a tile in the row 205 in the tile section 201. With no remaining items, the stack 245 may be empty and the indicator 275 may be omitted or indicate that there are no further items remaining.

As the above process is being used, the feature for preceding items may also be included. That is, the initial or first output may include the tile section 201, the stack section 202, and the indicator 275. When the first forward scrolling input is received, the second output may include the tile section 201 with an updated set of tiles, the stack section 202 with an updated set of tiles, and the indicator 275 with an updated indication. The scroll display 200 may also include another stack section of the items that were in the tile section 201 in the preceding output (e.g., the first output) as well as an another indicator indicating the number of items now present in the preceding list of items.

It is noted the above process is described with a forward scrolling input that shifts the items by the maximum number of items allowed in the tile section 201 (when applicable). For example, when the maximum number of items allowed in the tile section 201 is seven items and the number of remaining items is seven or greater, a forward scrolling input shifts the items by seven at a time. However, this manner of forward scrolling the items is only exemplary. The exemplary embodiments may be modified to allow for scrolling any number items. For example, a forward scrolling input may shift the items by one, two, three, etc. up to any amount, even greater than the maximum number of items allowed in the tile section 201. The forward scrolling input may be for a fixed number of items or may be for a dynamic number of items. The stack section 202 and the indicator section 203 may be updated accordingly based on the items being shifted via the forward scrolling input.

It is also noted that the above mechanism may be applicable to the scrolling input being used in a reverse direction. Thus, if a reverse scrolling input is used to shift the items in an opposite direction, the stack section 202 may be updated with items in the tile section 201 and the indicator section 203 may be updated to be an increased value.

Figure 3:
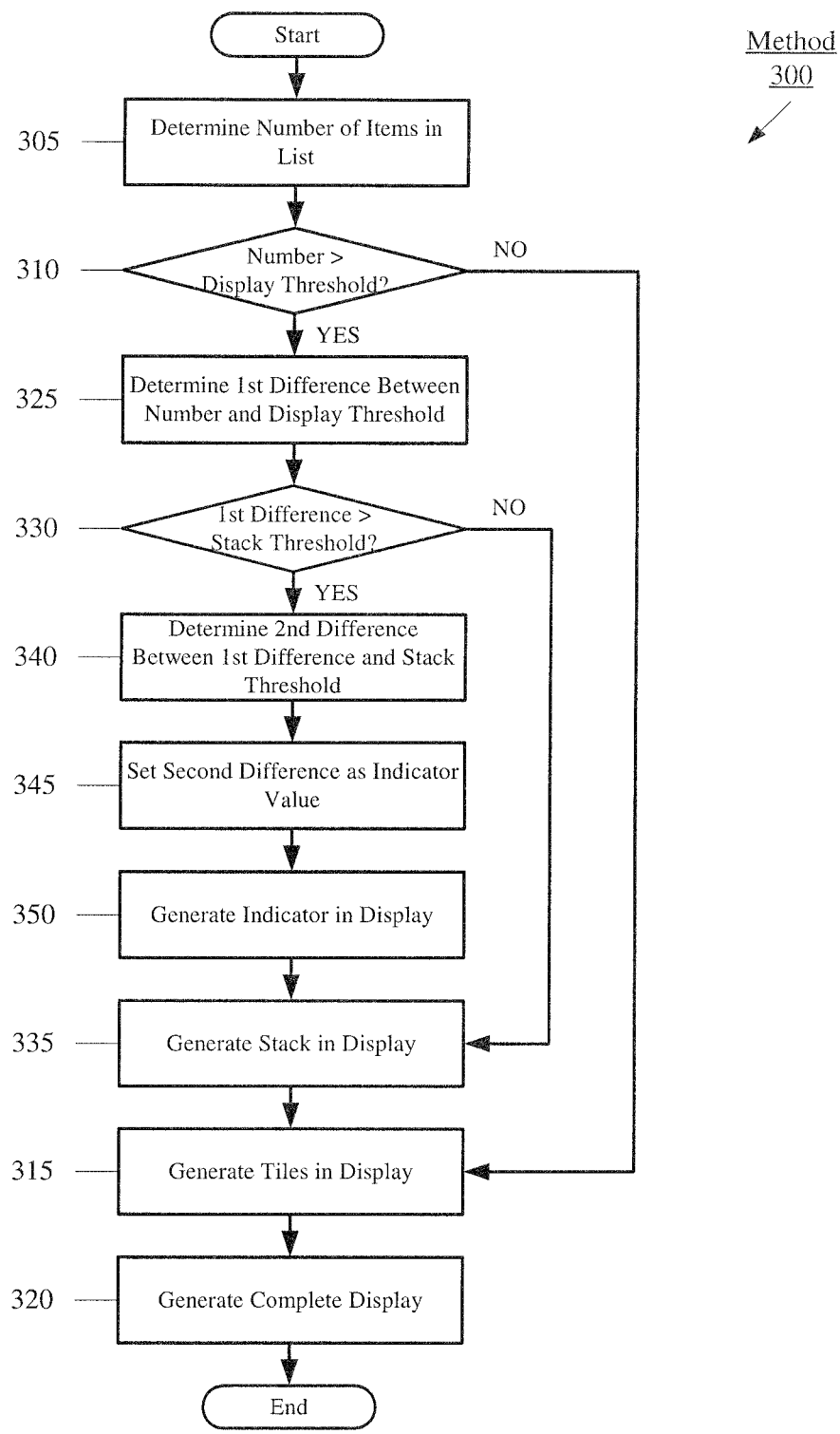
FIG. 3 shows a method of determining a manner in which a scroll display for a list of items is generated according to the exemplary embodiments.

FIG. 3 shows a method of determining a manner in which a scroll display for a list of items is generated according to the exemplary embodiments. The method 300 relates to the process by which the user device 105 is configured to generate the scroll display 200 based on a list of items. However, as noted above, the method 300 may also be performed by the website server 120 and provided to the user device 105. Although the description above related to the indicator 275 being inclusive of the stack 245, the method 300 is described according to another exemplary embodiment where the indicator 275 is exclusive of the stack 245 and the number of items in the stack 245 are not included in the indicator 275. The method 300 will be described with regard to the scroll display 200 of FIG. 2.

In 305, the user device 105 determines a number of items in the list. As noted above, a set of one or more items may be stored on a memory of the user device 105 or may be received from a remote source such as the website server 120. There may be a known number of items that are to be considered when generating the scroll display 200.

In 310, the user device 105 determines whether the number of items is greater than a display threshold. The display threshold may correspond to the maximum number of allowed items that may be included in the row 205 of the tile section 201 (e.g., seven items). That is, the user device 105 may determine whether there are any remaining items once the row 205 in the tile section 201 is created. If the number of items is not greater than the display threshold, the user device 105 continues the method 300 to 315. In 315, the user device 105 generates the tiles in the tile section 201 for the scroll display 200 without the stack 245 or the indicator 275. Thus, in 320, the user device 105 generates the complete scroll display 200 in which only the tile section 201 is included.

If the number of items is greater than the display threshold, the user device 105 continues the method 300 from 310 to 325. In 325, the user device 105 determines a first difference between the number of items and the display threshold. The first difference may be used in determining the manner in which the stack 245 and the indicator 275 are to be used. Thus, in 330, the user device determines whether the first difference is greater than a stack threshold. The stack threshold may correspond to the maximum number of allowed items that may be included in the stack 245 of the stack section 202 (e.g., five items). That is, the user device 105 may determine whether there are any remaining items once the stack 245 in the stack section 202 is created. If the number of items is not greater than the stack threshold, the user device 105 continues the method 300 to 335. In 335, the user device 105 generates the stack 245 in the stack section 202 for the scroll display 200. Subsequently, in 315, the user device 105 generates the tiles in the tile section 201 for the scroll display 200 that will also include the stack 245 but does not include the indicator 275. Thus, in 320, the user device 105 generates the complete scroll display 200 in which the tile section 201 and the stack section 202 are included.

If the number of items is greater than the stack threshold, the user device 105 continues the method 300 from 330 to 340. In 340, the user device 105 determines a second difference between the first difference and the stack threshold. The second difference may be used in determining the number of remaining items after the tile section 201 and the stack section 202 have been created. That is, the second difference may correspond to how the indicator 275 is to be created for the indicator section 203. Thus, in 345, the user device 105 sets the second difference as the indicator value such that in 350, the user device 105 generates the indicator 275 in the indicator section 203 for the scroll display 200. Subsequently, in 335, the user device 105 generates the stack 245 in the stack section 202 for the scroll display 200 and, in 315, the user device 105 generates the tiles in the tile section 201 for the scroll display 200 that will also include the stack 245 but does not include the indicator 275. Thus, in 320, the user device 105 generates the complete scroll display 200 in which the tile section 201 and the stack section 202 are included.

It is noted that the schedule or timing of operations in the method 300 is only exemplary. That is, the operations of the method 300 are not required to proceed according to the description above. In another exemplary embodiment, the operations of the method may proceed in any order or in parallel sequences. For example, if the indicator 275 is to be inclusive of the items in the stack 245, the operations to generate the stack and the indicator 275 may be performed in parallel as the indicator 275 is to also include the number of items in the stack 245.

It is also noted that the method 300 may incorporate the features described above for the scroll display 200. For example, as described above, the scroll display 200 may include a preceding stack and a preceding indicator for items in the list that have been viewed and passed from a forward scrolling input. Thus, the method 300 may include operations that incorporate this feature. In another example, the method 300 may include operations that receive and process scrolling inputs, both forward and reverse. In this manner, the scrolling input may provide a further consideration as to a number of items that are remaining, a number of items that have been viewed, etc. In a further example, the method 300 may include operations that select or determine the images/titles that are to be used in the tiles 210-240 of the tile section 201 as well as the tiles 250-270 of the stack section 202.

It is further noted that the method 300 omitting the stack 245 when only the row 205 is necessary and omitting the indicator 275 when only the row 205 and the stack 245 are necessary are only exemplary. As noted above, the indicator 275 may be included whenever the scroll display 200 is generated. The stack 245 may also be included whenever the scroll display 200 is generated. For example, the stack 245 may be shown as empty or the indicator 275 may include an "end" indication for the list of items.

The exemplary embodiments provide a device, system, and method for generating a tiling scroll display where an intuitive view is created such that a user viewing the scroll display may identify upcoming items when scrolling forward or previous items when scrolling backward. The scroll display may also include indications of remaining items that are included in the scroll display in both a forward or backward direction. By including identifying features in the tiles of the scroll display, the user may be able to identify the items being shown in a tile section of the scroll display and a stack section of the scroll display.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system such as Microsoft Windows, a Mac platform and MAC OS, a mobile device having an operating system such as iOS or Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method for generating a graphical user interface including a scroll display for a set of items, comprising:
   determining a total number of items in the set of items;
   generating a tile section for the scroll display to include full tiles for each of a first subset of the items, a number of the items in the first subset of the items being no greater than a display threshold defining a maximum number of items to be included in the tile section;
   when the total number of items is greater than the display threshold, generating a first stack section to include preview tiles for each of a second subset of the items, the second subset of the items including a preview tile for each of a up to a first stack threshold, the first stack threshold defining a predetermined number of items to be included in the first stack section; and
   displaying the tile section and the first stack section.

2. The method of claim 1, further comprising:
   receiving the set of the items from one of a local memory arrangement, a remote source, or a combination thereof.

3. The method of claim 1, wherein the method is performed by a remote source, the method further comprising:
at a remote source:
transmitting the scroll display to a user device for display thereon.

4. The method of claim 1, wherein a first one of the full tiles includes at least one first identifying feature, the first identifying feature being a full depiction corresponding to content associated with the first one of the full tiles.

5. The method of claim 4, wherein the first identifying feature is one of an image, a title, or a combination thereof.

6. The method of claim 4, wherein a first one of the preview tiles includes at least one second identifying feature, the second identifying feature being a preview depiction corresponding to a reference to content associated with the first one of the preview tiles.

7. The method of claim 6, wherein the second identifying feature is one of a partial image, a partial title, or a combination thereof.

8. The method of claim 1, wherein the first stack section extends from one of the full tiles in the tile section.

9. The method of claim 8, wherein the preview tiles of the first stack section cascade from the one of the full tiles in the tile section from a first size to a last size, the first size being less than a full size of the one of the full tiles, the last size being less than the first size.

10. The method of claim 8, wherein each of the preview tiles of the first stack section has an image characteristic of one of less clarity, more fading, more dimming, or a combination thereof than the one of the full tiles.

11. The method of claim 1, further comprising:
when the total number of items is greater than a sum of the display threshold plus the first stack threshold, generating an indicator section for the scroll display to include an indicator identifying a number of first remaining items, the first remaining items being one of items absent from the tile section and items absent from a combination of the tile section and the first stack section; and
generating the scroll display to further include the first indicator section.

12. The method of claim 1, further comprising:
receiving an input to scroll forward on the scroll display;
replacing, in the tile section, the first subset of the items with a third subset of the items based on the scroll forward input, so that the tile section includes a full tile for each of the items in the third subset of the items, a number of items in the third subset of the items being no greater than the display threshold, the third subset including at least one of the second subset of the items; and
displaying the third subset of the items in the tile section.

13. The method of claim 12, further comprising:
when the scroll input moves a number of items from the first stack section toward the tile section greater than the display threshold, generating a second stack section including a preview tile for each of a fourth subset of the items that have scrolled past the tile section, a number of items in the fourth subset of the items being no greater than a second stack threshold; and
displaying the second stack section.

14. The method of claim 13, further comprising:
when the number of items moved from the first stack section toward the tile section via the scroll input is greater than the sum of the display threshold and the second stack threshold, generating a second indicator section for the scroll display, the second indicator section identifying a further number of remaining items; and
displaying the second indicator section.

15. The method of claim 14, wherein the second stack section extends from one of the full tiles in the tile section.

16. The method of claim 1, wherein, when the total number of items is greater than the display threshold and the number of items in the second subset of items is less than the first stack threshold, the number of preview tiles in the first stack section is different than when the number of items in the second subset of items is at least the first stack threshold.

17. A user device, comprising:
a display device configured to show a graphical user interface including a scroll display for a set of items; and
a processor generating the scroll display by:
determining a total number of items in the set of items;
generating a tile section including a full tile for each of a first subset of the items, a number of the items in the first subset of the items being no greater than a display threshold, the display threshold defining a maximum number of items to be included in the tile section;
when the total number of items is greater than the display threshold, generating a stack section including a preview tile for each of a second subset of the items, a number of items in the second subset of the items being no greater than a stack threshold defining a maximum number of items to be included in the stack section; and
displaying the tile section and the stack section.

18. The user device of claim 17, further comprising:
a memory arrangement configured to store the set of items.

19. The user device of claim 17, further comprising:
a transceiver configured to receive the set of items from a remote source.

20. A server, comprising:
a processor generating a graphical user interface including a scroll display for a set of items, the graphical user interface to be shown on a display device of a user device, the processor generating the scroll display by:
determining a total number of items in the set of items;
generating a tile section for the scroll display to include a full tile for each of a first subset of the items, a number of items in the first subset of the items being no greater than a display threshold defining a maximum number of items to be included in the tile section;
when the number of items is greater than the display threshold, generating a stack section including a preview tile for each of a second subset of the items, a number of items in the second subset of the items being no greater than a stack threshold defining a maximum number of items to be included in the stack section; and
displaying the tile section and the stack section; and
a transceiver configured to transmit the graphical user interface to the user device.

* * * * *